(12) United States Patent
Kim

(10) Patent No.: US 12,135,910 B2
(45) Date of Patent: Nov. 5, 2024

(54) DISPLAY APPARATUS THAT PROVIDES IMAGE INFORMATION AND CONTROL METHOD THEREOF

(71) Applicant: SAMSUNG ELECTRONICS CO., LTD., Suwon-si (KR)

(72) Inventor: Heemin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/369,373

(22) Filed: Sep. 18, 2023

(65) Prior Publication Data

US 2024/0061633 A1 Feb. 22, 2024

Related U.S. Application Data

(63) Continuation of application No. PCT/KR2023/007457, filed on May 31, 2023.

(30) Foreign Application Priority Data

Aug. 19, 2022 (KR) ........................ 10-2022-0104292

(51) Int. Cl.
*G06F 3/14* (2006.01)
*G06T 7/194* (2017.01)
*G06V 10/74* (2022.01)

(52) U.S. Cl.
CPC ................ *G06F 3/14* (2013.01); *G06T 7/194* (2017.01); *G06V 10/761* (2022.01)

(58) Field of Classification Search
CPC ......... G06F 3/14; G06T 7/194; G06V 10/761; G06V 20/41
See application file for complete search history.

(56) References Cited

U.S. PATENT DOCUMENTS

| 8,594,437 B2 | 11/2013 | Watanabe et al. |
| 9,594,957 B2 | 3/2017 | Tanaka et al. |

(Continued)

FOREIGN PATENT DOCUMENTS

| JP | 2001-198350 A | 7/2001 |
| JP | 2002-153676 A | 5/2002 |

(Continued)

OTHER PUBLICATIONS

International Search Report (PCT/ISA/210) issued on Sep. 15, 2023 by the International Searching Authority in International Patent Application No. PCT/KR2023/007457.
Written Opinion (PCT/ISA/237) issued on Sep. 15, 2023 by the International Searching Authority in International Patent Application No. PCT/KR2023/007457.

*Primary Examiner* — Koosha Sharifi-Tafreshi
(74) *Attorney, Agent, or Firm* — Sughrue Mion, PLLC

(57) ABSTRACT

A display apparatus includes a communication interface; a display; a memory configured to store a plurality of application image frames; and one or more processors configured to, based on a first output image frame that is output to the display and the plurality of application image frames, obtain frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number, transmit a request based on profile information including identification information of the application and the frame information to a server, and control the display to provide video information corresponding to the request.

20 Claims, 10 Drawing Sheets

(56) References Cited

U.S. PATENT DOCUMENTS

| | | |
|---|---|---|
| 9,881,215 B2 | 1/2018 | Tanaka et al. |
| 10,123,081 B2 | 11/2018 | Kim et al. |
| 10,478,728 B2 | 11/2019 | Kurabayashi |
| 11,513,669 B2 * | 11/2022 | Chhabra .............. G06F 3/04817 |
| 2001/0009867 A1 | 7/2001 | Sakaguchi et al. |
| 2011/0274360 A1 | 11/2011 | Watanabe et al. |
| 2013/0077876 A1 | 3/2013 | Tanaka et al. |
| 2013/0083999 A1 | 4/2013 | Bhardwaj et al. |
| 2016/0182956 A1 | 6/2016 | Kim et al. |
| 2017/0140226 A1 | 5/2017 | Tanaka et al. |
| 2017/0282073 A1 | 10/2017 | Kurabayashi |
| 2021/0144442 A1 | 5/2021 | Liu et al. |

FOREIGN PATENT DOCUMENTS

| | | |
|---|---|---|
| JP | 2009-60413 A | 3/2009 |
| JP | 2011-223325 A | 11/2011 |
| JP | 2011-237879 A | 11/2011 |
| KR | 10-2012-0077104 A | 7/2012 |
| KR | 10-1604250 B1 | 3/2016 |
| KR | 10-2017-0096179 A | 8/2017 |
| KR | 10-2018-0099126 A | 9/2018 |
| KR | 10-2020-0003619 A | 1/2020 |
| KR | 10-2020-0108573 A | 9/2020 |
| KR | 10-2173153 B1 | 11/2020 |
| KR | 10-2244561 B1 | 4/2021 |

* cited by examiner

FIG. 5

| Game id | backgroud name | Object name | try num | create date |
|---|---|---|---|---|
| USER1 | chapter 1 middle town | wolf boss | 6 | 2022/5/12 00:02:30 |
| USER2 | chapter 2 West | Final boss | 20 | 2022/5/12 00:05:30 |
| USER3 | chapter 6 forest | Quest 3 boss | 50 | 2022/5/12 00:06:30 |
| USER4 | chapter 5 temple | step 3 boss | 60 | 2022/5/12 01:02:30 |
| USER5 | chapter 1 middle town | Medusa | 20 | 2022/5/12 05:02:30 |

< Log Data>

FIG. 9

| Game id | search string | priority | Realtime |
|---|---|---|---|
| USER1 | GAME 'A' chapter 5 middle town wolf boss tip | 1 | True |
| USER1 | GAME 'A' chapter 3 West Final boss weak point tip | 2 | False |
| USER1 | GAME 'A' chapter 1 forest Quest 3 boss tip walkthrough | 3 | False |

< Profile Information >

DISPLAY APPARATUS THAT PROVIDES IMAGE INFORMATION AND CONTROL METHOD THEREOF

This application is a by-pass continuation application of International Application No. PCT/KR2023/007457, filed on May 31, 2023, which is based on and claims priority to Korean Patent Application No. 10-2022-0104292, filed on Aug. 19, 2022, in the Korean Intellectual Property Office, the disclosures of which are incorporated by reference herein in their entireties.

BACKGROUND

Technical Field

Apparatuses and methods consistent with the disclosure relate to a display apparatus and a control method thereof, and more particularly, to a display apparatus for obtaining and providing video information using profile information and a control method thereof.

Background

Various types of display apparatuses are being developed and disseminated.

Additionally, the number of households equipped with various source devices to be used with display apparatuses, for example, a video game console, is increasing.

Users who enjoy games using consoles want to be provided with various types of game-related content and streaming videos while operating the games or when playing the games, but there is no platform that provides user-customized content or video.

For example, in order to find videos related to current chapters and stages while operating games, it is inconvenient for users to directly access service providing platforms and search for videos by inputting keywords (or search words) related to the current chapters and stages.

There is a demand for a service method that automatically searches for user-customized videos (for example, videos related to chapters and stages of games currently being provided from the display apparatus) and provides search results without users directly inputting keywords.

SUMMARY

A display apparatus may include: a communication interface; a display; a memory configured to store a plurality of application image frames; and one or more processors. The one or more processors may be configured to: based on a first output image frame that is output to the display and the plurality of application image frames, obtain frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number, transmit a request based on profile information including identification information of the application and the frame information to a server through the communication interface, and control the display to provide video information received from the server through the communication interface corresponding to the request.

The profile information may further include number information corresponding to the number of the plurality of application image frames having the similarity. The one or more processors may be further configured to: store the first output image frame in the memory, when identifying, based on a second output image frame acquired after a predetermined time has elapsed from the first output image frame being acquired and the plurality of application image frames stored in the memory, that (i) a number of the plurality of application image frames having a similarity to the second output image frame equal to or greater than the threshold value is equal to or greater than the threshold number and (ii) a similarity between the first output image frame and the second output image frame is equal to or greater than the threshold value, increase the number information included in the profile information, and when identifying that (i) the number of the plurality of application image frames having the similarity to the second output image frame equal to or greater than the threshold value is equal to or greater than the threshold number, and (ii) the similarity between the first output image frame and the second output image frame is less than the threshold value, generate second profile information corresponding to the second image output frame.

The one or more processors being configured to increase the number information may include being configured to: compare a similarity between a first background included in the first output image frame and a second background included in the second output image frame and a similarity between a first object included in the first output image frame and a second object included in the second output image frame, and when each of the similarity between the first background and the second background and the similarity between the first object and the second object is equal to or greater than the threshold value, identify that similarity between the first output image frame and the second output image frame is equal to or greater than the threshold value.

The one or more processors may be further configured to: control the display to provide a screen corresponding to content when the content is received from an external device through the communication interface, and obtain the identification information of the application based on at least one content image frame corresponding to the content.

The memory may be configured to store the profile information corresponding to each of a plurality of users. The one or more processors may be further configured to: obtain the profile information corresponding to a user of the plurality of users selected through a user interface (UI), and control the display to output the video information received from the server to a specific area of the display when the application is executed.

The profile information corresponding to each of the plurality of users may include identification information of the user, the identification information of the application, the frame information, the number information, or an acquisition time of the profile information. The one or more processors may be further configured to obtain a priority of the profile information based on at least one of the number information included in the profile information of each of the plurality of users or the acquisition time of the profile information.

The one or more processors may be further configured to transmit to the server the request based on the profile information corresponding to a top priority based on a priority corresponding to each of a plurality of profiles corresponding to the selected user.

The one or more processors may be further configured to: input the plurality of profiles stored in the memory to a neural network model to obtain specific background information and specific object information having a correlation between the frame information included in each of the plurality of profiles and a correlation with the frame information included in the first output image frame equal to or greater than the threshold value, and transmit a request including the acquired specific background information and the specific object information to the server.

The video information may include a plurality of video information. The one or more processors may be further configured to control the display to output the plurality of video information sorted according to a priority when the plurality of video information is received from the server according to the request. Each of the plurality of video information may include a thumbnail image of corresponding video.

The one or more processors may be further configured to control the display so that real-time video is output prior to recorded video according to the priority among the plurality of video information.

A method of controlling a display apparatus may include: outputting a first output image frame through a display; based on the first output image frame and a plurality of application image frames, obtaining frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number; transmitting a request based on profile information including identification information of the application and the frame information to a server; and providing video information received from the server corresponding to the request.

The profile information may further include number information corresponding to the number of the plurality of application image frames having the similarity. The method may further include: storing the first output image frame; when identifying, based on a second output image frame acquired after a predetermined time has elapsed from the first output image frame being acquired and the plurality of application image frames, that a number of the plurality of application image frames having (i) a similarity to the second output image frame equal to or greater than the threshold value is equal to or greater than the threshold number and (ii) a similarity between the first output image frame and the second output image frame is equal to or greater than the threshold value, increasing the number information included in the profile information; and when identifying that (i) the number of the plurality of application image frames having the similarity to the second output image frame equal to or greater than the threshold value is equal to or greater than the threshold number, and (ii) the similarity between the first output image frame and the second output image frame is less than the threshold value, generating second profile information corresponding to the second image output frame.

The increasing of the number information may include: comparing a similarity between a first background included in the first output image frame and a second background included in the output second image frame and a similarity between a first object included in the first output image frame and a second object included in the second output image frame; and when each of the similarity between the first background and the second background and the similarity between the first object and the second object is equal to or greater than the threshold value, identifying that similarity between the first output image frame and the second output image frame is equal to or greater than the threshold value.

The method may further include: controlling the display to provide a screen corresponding to content when the content is received from an external device; and obtaining the identification information of the application based on at least one content image frame corresponding to the content.

The display apparatus may store profile information corresponding to each of a plurality of users. The method may further include: obtaining the profile information corresponding to a user of the plurality of users selected through a user interface (UI); and controlling the display to output the video information received from the server to a specific area of the display when the application is executed.

The profile information corresponding to each of the plurality of users may include identification information of the user, the identification information of the application, the frame information, the number information, or an acquisition time of the profile information. The method may further include obtaining a priority of the profile information based on at least one of the number information included in the profile information of each of the plurality of users or the acquisition time of the profile information.

The method may further include transmitting to the server the request based on the profile information corresponding to a top priority based on a priority corresponding to each of a plurality of profiles corresponding to the selected user.

The method may further include: inputting the plurality of profiles stored in the memory to a neural network model to obtain specific background information and specific object information having a correlation between the frame information included in each of the plurality of profiles and a correlation with the frame information included in the first output image frame equal to or greater than the threshold value, and transmitting a request including the acquired specific background information and the specific object information to the server.

The video information may include a plurality of video information. The method may further include controlling the display to output the plurality of video information sorted according to a priority when the plurality of video information is received from the server according to the request. Each of the plurality of video information may include a thumbnail image of corresponding video.

The method may further include controlling the display so that real-time video is output prior to recorded video according to the priority among the plurality of video information.

A non-transitory computer readable recording medium may include a program for executing a control method of a display apparatus. The control method may include: outputting a first output image frame through a display; based on the first output image frame and a plurality of application image frames, obtaining frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number; transmitting a request based on profile information including identification information of the application and the frame information to a server; and providing video information received from the server corresponding to the request.

BRIEF DESCRIPTION OF THE DRAWINGS

The above and/or other aspects of the disclosure will be more apparent by describing certain embodiments of the disclosure with reference to the accompanying drawings, in which:

FIG. 5 is a diagram for describing log data according to one or more embodiments of the disclosure;

FIG. 9 is a diagram for describing a priority of profile information according to one or more embodiments of the disclosure.

DETAILED DESCRIPTION

Figure 1:
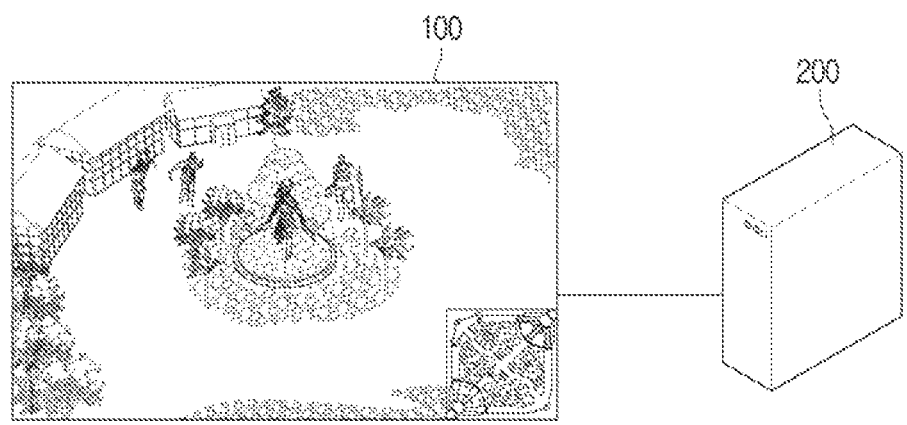
FIG. 1 is a diagram for describing a display apparatus providing a screen according to one or more embodiments of the disclosure.

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have," "may have," "include," "may include," or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B."

Expressions "first," "second," "1$^{st}$" or "2$^{nd}$" or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In the disclosure, a "module" or a "~er/or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware.

In the disclosure, the term user may refer to a person using an electronic device or a device (for example, an artificial intelligence electronic device) using an electronic device.

Hereinafter, an embodiment of the disclosure will be described in detail with reference to the accompanying drawings.

FIG. 1 is a diagram for describing a display apparatus providing a screen according to one or more embodiments of the disclosure.

A display apparatus 100 may provide video. The display apparatus 100 may be implemented as a TV, but is not limited thereto, and any apparatus equipped with a display function, such as a video wall, a large format display (LFD), a digital signage, a digital information display (DID), and a projector display, may be applied without limitation. In addition, the display apparatus 100 may be implemented in various types of displays such as a liquid crystal display (LCD), an organic light emitting diode (OLED), a liquid crystal on silicon (LCoS), a digital light processing (DLP), a quantum dot (QD) display panel, and quantum dot light-emitting diodes (QLED).

The display apparatus 100 may perform communication with the external device 200 and provide video received from the external device 200.

The external device 200 may be implemented in various types of electronic devices. For example, the external device 200 is a video game console and may provide game video to the display apparatus 100. However, this is an example and the external device 200 may be implemented in various types of electronic devices providing video, such as a Blu Ray player, a digital versatile disc (DVD) player, a streaming content output device, a set-top box, a cloud server, an over-the-top media service (OTT) server, and a PC.

For example, the external device 200 may be implemented as a cloud server, and the cloud server may provide a video game as streaming using a cloud computing technology so that the display apparatus 100 may play the video game remotely.

The display apparatus 100 itself may not store and install the video game, and the display apparatus 100 may access the cloud server to receive a plurality of image frames corresponding to the video game through the streaming, and a user of the display apparatus 100 may play the video game remotely.

Hereinafter, for convenience of description, a case in which the external device 200 is a console and the display apparatus 100 provides game video received from the external device 200 will be described.

Figure 2:
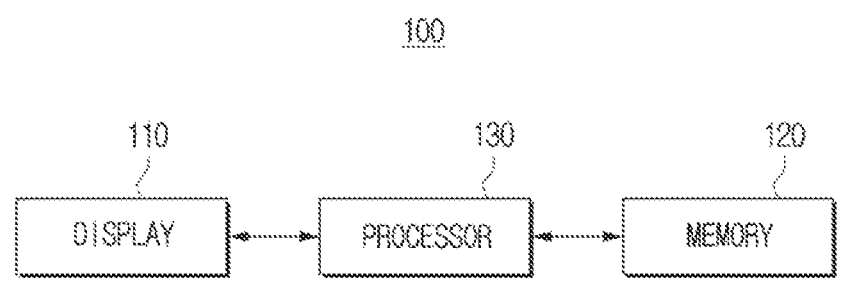
FIG. 2 is a block diagram illustrating a configuration of the display apparatus according to the embodiment of the disclosure.

FIG. 2 is a block diagram illustrating a configuration of the display apparatus according to the embodiment of the disclosure.

The display apparatus 100 may include a display 110, a memory 120, and a processor 130.

The display 110 may be implemented in various types of displays such as a liquid crystal display (LCD), an organic light emitting diode (OLED), a liquid crystal on silicon (LCoS), a digital light processing (DLP), a quantum dot (QD) display panel, quantum dot light-emitting diodes (QLED), micro light-emitting diodes (μLED), and a mini LED.

The display apparatus 100 may be implemented as a touch screen combined with a touch sensor, a flexible display, a rollable display, a 3D display, and a display to which a plurality of display modules are physically connected.

The memory 120 may store data necessary for various embodiments of the disclosure. The memory 120 may be implemented in a form of a memory embedded in the display apparatus 100 or a form of a memory detachable from the display apparatus 100, depending on a data storage purpose. For example, data for driving the display apparatus 100 may be stored in the memory embedded in the display apparatus 100, and data for an extension function of the display apparatus 100 may be stored in the memory detachable from the display apparatus 100. The memory embedded in the display apparatus 100 may include at least one of, for example, a volatile memory (for example, a dynamic random access memory (DRAM), a static RAM (SRAM), a synchronous dynamic RAM (SDRAM)), a non-volatile memory (for example, a one time programmable read only memory (OTPROM), a programmable ROM (PROM), an erasable and programmable ROM (EPROM), an electrically erasable and programmable ROM (EEPROM), a mask ROM, or a flash ROM), a flash memory (for example, a NAND flash, or a NOR flash), a hard drive, and a solid state drive (SSD)). In addition, the memory 120 detachable from the display apparatus 100 may be implemented in the form of the memory card (e.g., compact flash (CF), secure digital (SD), micro secure digital (Micro-SD), mini secure digital (Mini-SD), extreme digital (xD), multi-media card (MMC), etc.), and external memory (e.g., USB memory) connectable to a USB port.

The memory 120 may store at least one instruction or a computer program including instructions for controlling the display apparatus 100.

Various data may be stored in the external memory of the processor 120, some of the data may be stored in an internal memory of the processor 120, and the rest may also be stored in the external memory.

In particular, the memory 120 may acquire and store a plurality of image frames by capturing a screen being provided through the display 110 under the control of the processor 130.

One or more processors 130 according to one or more embodiments of the disclosure may control overall operations of the display apparatus 100.

The processor 130 may be implemented by a digital signal processor (DSP), a microprocessor, or a time controller (TCON) processing a digital signal. However, the processor 130 is not limited thereto, but may include one or more of a central processing unit (CPU), a micro controller unit (MCU), a micro processing unit (MPU), a controller, an application processor (AP), a communication processor (CP), and an ARM processor, or an artificial intelligence (AI) processor, or may be defined by these terms. In addition, the processor 130 may be implemented by a system-on-chip (SoC) or a large scale integration (LSI) in which a processing algorithm is embedded, or may be implemented in a field programmable gate array (FPGA) form. The processor 130 may perform various functions by executing computer executable instructions stored in the memory.

In particular, the processor 130 according to one or more embodiments of the disclosure may acquire an image frame by capturing a screen output on the display 110 and store the image frame in the memory 120. For example, the processor 130 may acquire a plurality of image frames by capturing a screen at a predetermined time interval (or a preset time interval).

When the processor 130 according to an embodiment enters a mode for executing a game (hereinafter referred to as an execution mode), a screen including game video may be captured at regular time intervals.

A game may be an example of an application, and the processor 130 may of course execute various applications other than the game. For example, of course, the processor 130 may acquire a plurality of image frames by executing a moving image playback application and capturing a screen at regular time intervals while executing the moving image playback application.

The processor 130 may acquire a first image frame output to the display and compare the first image frame with a plurality of image frames stored in the memory 120.

Subsequently, when it is identified based on the comparison result that an image frame having a similarity to the first image frame equal to or greater than a threshold value among the plurality of image frames is equal to or greater than a threshold number, the processor 130 may identify an application (e.g., game) corresponding to the first image frame.

A detailed description thereof will be described with reference to FIG. 3.

Figure 3:
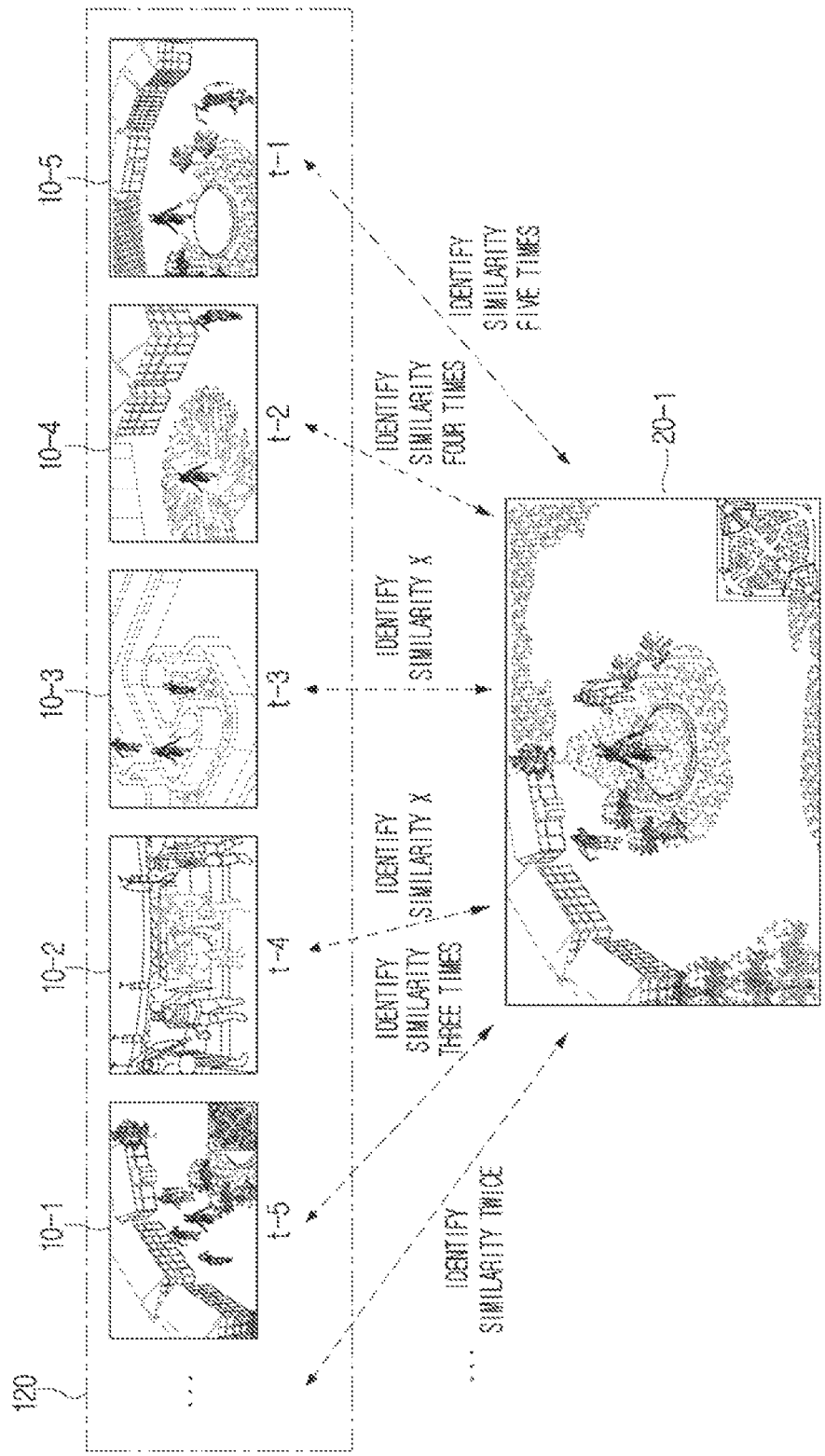
FIG. 3 is a diagram for describing a method of obtaining number information based on a similarity according to one or more embodiments of the disclosure.

FIG. 3 is a diagram for describing a method of obtaining number information based on similarity according to one or more embodiments of the disclosure.

Referring to FIG. 3, the memory 120 may store a plurality of image frames.

The memory 120 may store an image frame 10-1 obtained at a previous time, e,g., time t-5 to an image frame 10-5 obtained at time t-1.

Subsequently, the processor 130 may acquire a first image frame 20-1 corresponding to the screen being provided through the display at time t.

Subsequently, the processor 130 may identify a similarity between the image frame 10-1 obtained at time t-5 and the first image frame 20-1. In addition, the processor 130 may identify a similarity between the image frame 10-2 obtained at time t-4 and the first image frame 20-1, a similarity between the image frame 10-3 obtained at time t-3 and the first image frame 20-1, a similarity between the image frame 10-4 obtained at time t-2 and the first image frame 20-1, and a similarity between the image frame 10-5 acquired at time t-1 and the first image frame 20-1, respectively.

As illustrated in FIG. 3, when it is identified based on the comparison result that the image frame having the similarity to the first image frame equal to or greater than the threshold value among the plurality of image frames is equal to or greater than the threshold number, the processor 130 may identify the application corresponding to the first image frame.

For example, since each of the image frame 10-1 acquired at time t-5, the image frame 10-4 acquired at time t-2, and the image frame 10-5 obtained at time t-1 has a similarity (e.g., similarity of 80%) equal to or greater than the threshold value of the first image frame 20-1, when it is identified that an image frame having a similarity to the first image frame equal to or greater than the threshold value among the plurality of image frames stored in the memory 120 is equal to or greater than the threshold number (e.g., 5 times), the processor 130 may identify an application (e.g., GAME "A") corresponding to the first image frame.

The similarity identification method illustrated in FIG. 3 is represented by a sudo code as follows.

TABLE 1

```
memory_queue[ ] += add capture image
for i=1 to memory_queue_end do
    for j= 1 to memory_queue_end do
        compare memory_queue[i] and memory_queue[j]
        if ( histogram result + feature result )/2 >= 80
            memory_queue[i].pattern += 1
        endif
    endfor
endfor
```

Here, the processor 130 may sequentially store the image frames obtained at each time (e.g., time t-5 to time t) in the form of a memory queue.

The processor 130 may compare (comparing histogram) backgrounds included in each of the plurality of image frames 10-1, ..., 10-5 with a background of the first image frame 20-1, and compare (feature matching) objects included in each of the plurality of image frames 10-1, ..., 10-5 with an object included in the first image frame 20-1.

Subsequently, the processor 130 may identify (or count) information on the number of image frames having a similarity equal to or greater than 80% among the plurality of image frames 10-1, ..., 10-5 based on the background comparison result (histogram result in a code) and the object comparison result (feature result in a code).

Subsequently, when the information on the number of image frames having the similarity to the first image frame equal to or greater than the threshold value among the plurality of image frames stored in the memory 120 is equal to or greater than the threshold number (e.g., 5 times), the processor 130 may identify the application (e.g., GAME "A") corresponding to the first image frame.

The processor 130 may obtain the background information and the object information included in the first image frame from a data set corresponding to an application. A detailed description thereof will be described with reference to FIG. 4.

Figure 4:
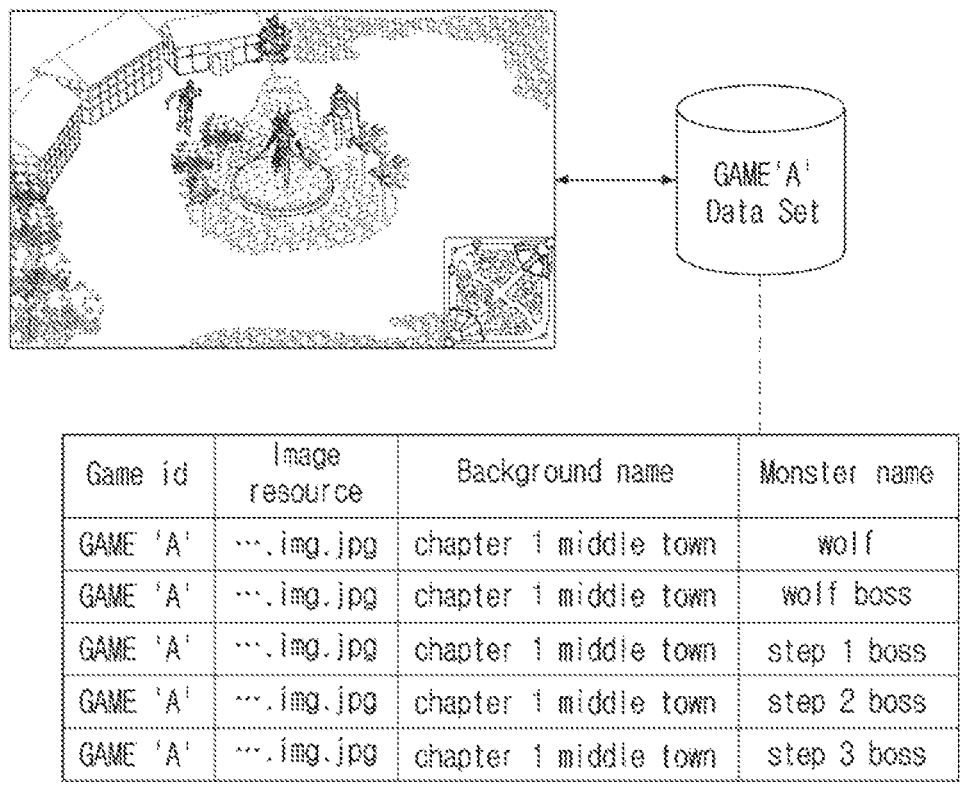
FIG. 4 is a diagram for describing a data set corresponding to an application according to one or more embodiments of the disclosure.

FIG. 4 is a diagram for describing a data set corresponding to an application according to one or more embodiments of the disclosure.

Referring to FIG. 4, the data set corresponding to the application may mean a meta database of the application and information related to the application. For example, when the application is the game "A," the meta database of the application may include a plurality of image files included in the GAME "A," attribute information on each of the plurality of image files, index information, background information (e.g., chapter, stage, location, etc.), and object information (e.g., monster name, item name, weapon name, etc.).

Subsequently, the processor 130 may obtain the background information and the object information included in the first image frame 20-1 based on the data set corresponding to the identified application.

For example, the processor 130 may compare each of the plurality of image files included in the data set with the first image frame 20-1 to identify the first image frame 20-1 having a similarity equal to or greater than the threshold value among the plurality of image files. Subsequently, the processor 130 may obtain the background information and the object information included in the first image frame 20-1 based on the identified image file. Hereinafter, for convenience of description, the background information and the object information will be collectively referred to as frame information.

The similarity identification method illustrated in FIG. 4 is represented by a sudo code as follows.

TABLE 2

```
meta_memory_queue[ ] += add game meta data image
if(image.pattern >= 5)
    for i=1 to meta_memory_queue_end do
        compare meta_memory_queue[i] and image
        if ( histogram result + feature result )/2 >= 90
            save log to log storage
        end if
    end for
endif
```

As described above, when the information on the number of image frames having the similarity to the first image frame equal to or greater than the threshold value among the plurality of image frames stored in the memory 120 is equal to or greater than the threshold number (e.g., 5 times), the processor 130 may identify the application (e.g., GAME "A") corresponding to the first image frame.

Subsequently, the processor 130 may obtain at least one image file having the similarity to the first image frame equal to or greater than the threshold among the plurality of image files included in the data set of the identified application.

The processor 130 may compare (comparing histogram) the backgrounds included in each of the plurality of image frames with the background of the first image frame 20-1, and compare (feature matching) the objects included in each of the plurality of image frames 10-1, ..., 10-5 with the object included in the first image frame 20-1.

Subsequently, the processor 130 may identify an image file having a similarity equal to or greater than 90% based on the background comparison result (histogram result in code) and the object comparison result (feature result in code) among the plurality of image files, and acquire the background information and the object information based on the identified image file.

Subsequently, the processor 130 may obtain the background information and the object information as the frame information, and may obtain the profile information including identification information (name (title) of an application, etc.) of an application and the frame information.

FIG. 5 is a diagram for describing log data according to one or more embodiments of the disclosure.

The log data illustrated in FIG. 5 may include identification information (e.g., user's game ID) of a user, the identification information of the application, the frame information, the number information, and an acquisition time of the frame information.

The number information may mean the number of image frames having the similarity to the first image frame 20-1 equal to or greater than the threshold value among the plurality of image frames.

As illustrated in FIG. 5, the number information may mean the number of trials (trial number, number of trials, number of attempts, etc.).

For example, when the processor 130 obtains the plurality of image frames while a game is playing, and a plurality of image frames including a specific background and a specific object may be identified among the plurality of image frames, it may mean that a user is having difficulty with certain backgrounds and certain objects while a game is playing.

Accordingly, the processor 130 may acquire the currently outputting image frame, that is, the first image frame 20-1, and identify whether the image frame having the similarity to the first image frame 20-1 equal to or greater than the threshold value is pre-stored in the memory 120.

When it is identified that the image frames having the similarity to the first image frame 20-1 equal to or greater than the threshold value is equal to or greater than the threshold number, the processor 130 may determine that the user is having difficulty in the background information and the object information corresponding to the first image frame 20-1 while playing the game. Meanwhile, when it is identified that the image frame having the similarity to the first image frame 20-1 equal to or greater than the threshold value is less than the threshold number, the processor 130 may store the first image frame 20-1 in the memory 120. Therefore, the processor 130 may transmit the frame information corresponding to the first image frame 20-1 to the external server, and receive a tip, walk-through, a capturing method, etc., corresponding to the frame information from the external server.

For example, the processor 130 may obtain and store the first image frame 20-1 in the memory 120 at time t, and obtain a second image frame after a predetermined time has elapsed from time t. Subsequently, the processor 130 may compare the second image frame with the plurality of image frames (e.g., the plurality of image frames including the first image frame 20-1) stored in the memory 120.

Subsequently, when it is identified based on the comparison result that the image frame having the similarity to the second image frame equal to or greater than the threshold value among the plurality of image frames is equal to or greater than the threshold number, and the similarity between the first image frame 20-1 and the second image frame is the threshold value or greater, the processor 130 may increase the number information included in the log data corresponding to the first image frame 20-1.

In addition, when it is identified based on the comparison result that an image frame having a similarity to the second image frame equal to or greater than the threshold value among the plurality of image frames is equal to or greater than the threshold number, and the similarity between the first image frame 20-1 and the second image frame is less than the threshold value, the processor 130 may generate the log data corresponding to the second image frame. Here, the log data corresponding to the second image frame may include the information on the number of image frames having the similarity to the second image frame or greater than the threshold value among the plurality of image frames.

Figure 6:
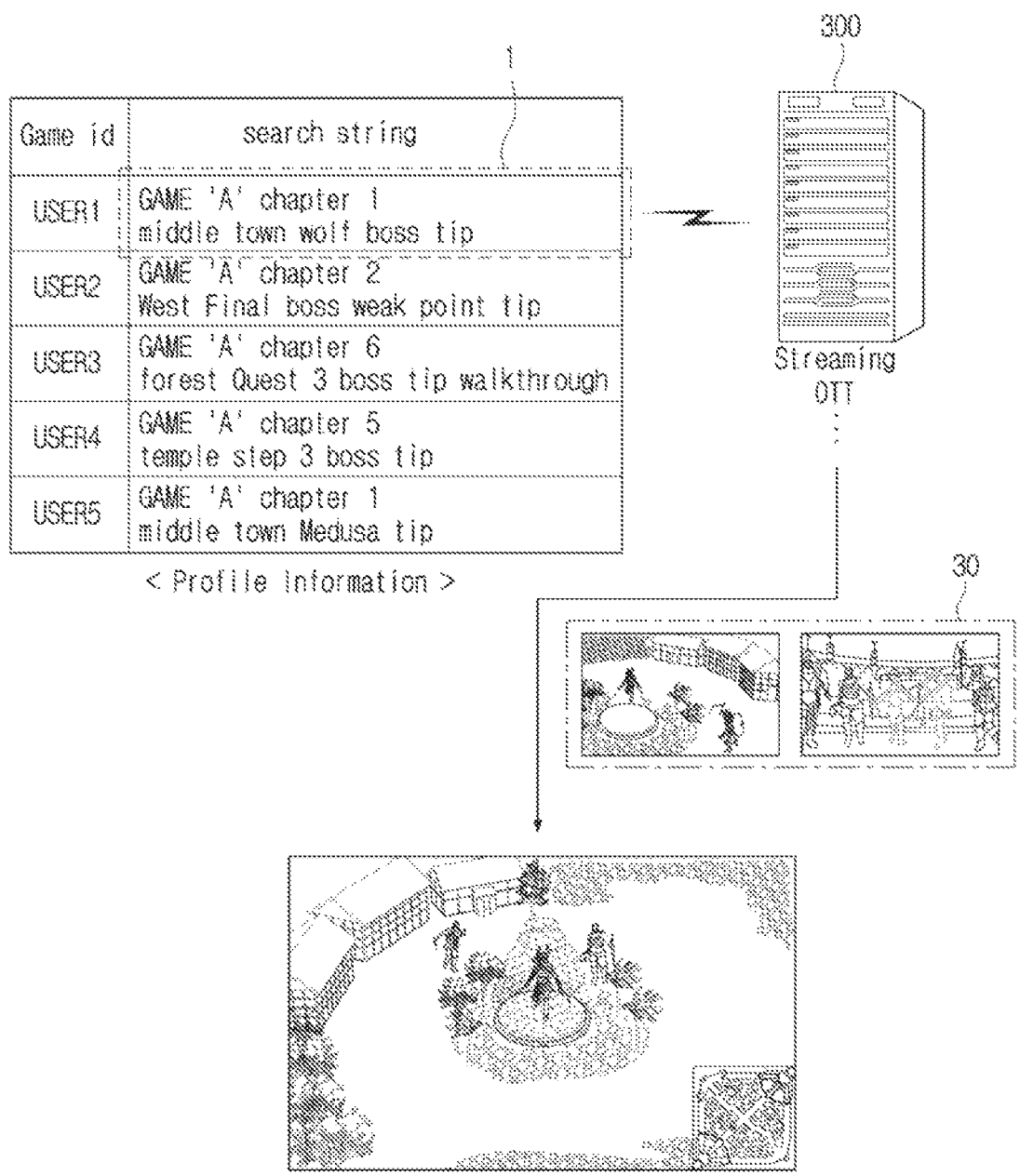
FIG. 6 is a diagram for describing profile information according to one or more embodiments of the disclosure.

FIG. 6 is a diagram for describing profile information according to one or more embodiments of the disclosure.

The processor 130 according to one or more embodiments of the disclosure may obtain the profile information including the identification information of the user, the identification information of the application, and the frame information based on the log data.

Also, the processor 130 may transmit a request 1 including the profile information to the server 300.

For example, the processor 130 may obtain the request 1 based on the profile information. The request information 1 may include at least one of the identification information of the application, the background information, the object information, or additional characters (e.g., weak point, tip, hint, walk-through) in a string form.

The additional characters do not necessarily have to be included, and the processor 130 may or may not include the additional characters when obtaining the request 1 based on the profile information.

Subsequently, the processor 130 may request a search from the external server 300 by using the request 1 as a search word (search string). Meanwhile, in the above-described embodiment, the case in which the processor 130 transmits the request 1 including the string form to the external server 300 has been described, but this is an example. It goes without saying that the processor 130 may transmit the request 1 including an image form to the external server 300 as well as the string form to the external server 300. For example, of course, the processor 130 may transmit the request 1 including the first image frame 20-1 to the external server 300.

When video information 30 is received from the external server 300 according to the request 1, the processor 130 according to one or more embodiments of the disclosure may control the display 110 to display the received video information 30 on one area of the screen.

Here, the video information 30 received from the external server 300 may mean a search result corresponding to the request 1. The external server 300 may mean a video streaming server, an over the top (OTT) server, and a server providing a video hosting service.

Figure 7:
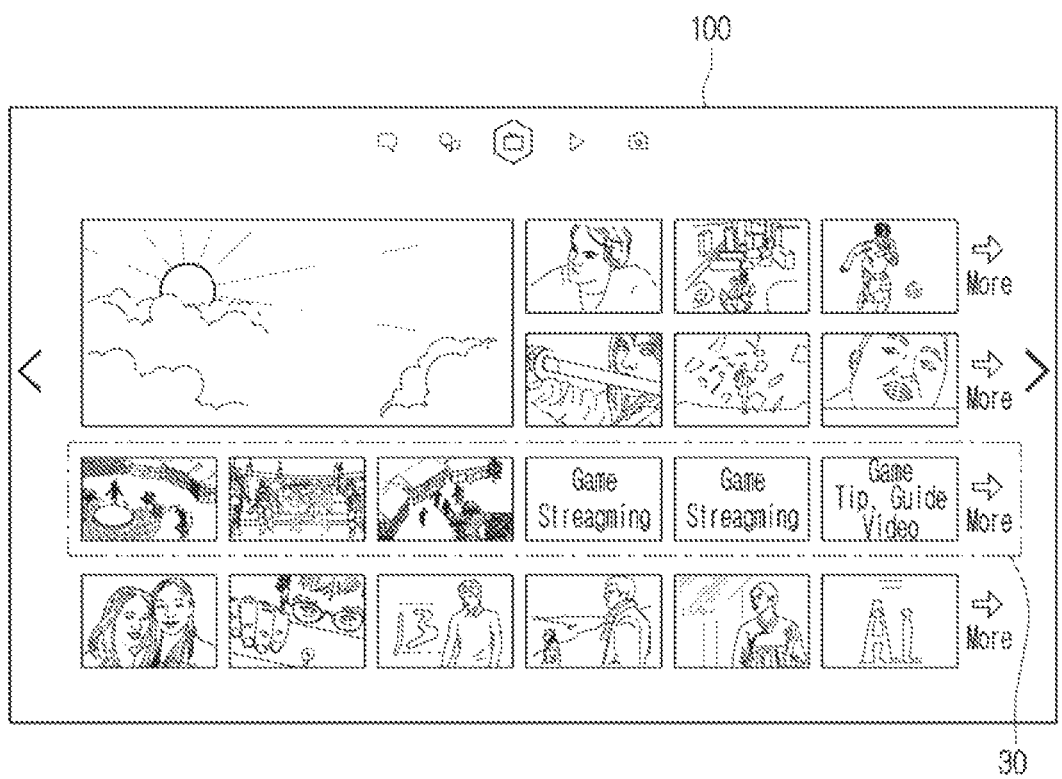
FIG. 7 is a diagram for describing a method of providing video information according to one or more embodiments of the disclosure.

FIG. 7 is a diagram for describing the method of providing video information according to the embodiment of the disclosure.

The display apparatus 100 may provide an application execution mode under the control of the processor 130.

For example, the display apparatus 100 may provide an application execution mode for providing content and applications provided from the external device 200, or the external server 300. However, this is an example, and it goes without saying that the application execution mode for executing the application stored in the memory 120 of the display apparatus 100 may be provided.

When the processor 130 according to an embodiment enters the application execution mode according to a user command, the video information 30 received from the external server 300 may be provided to one area on the execution mode. Here, it goes without saying that the user command may include a voice command received through a microphone (not illustrated) or a control command received from a remote control device (not illustrated).

When the processor 130 according to an embodiment enters the application execution mode according to the user command, an icon for executing an application provided from the external device 200 and the video information 30 (e.g., thumbnail image) received from the external server 300, and a thumbnail image for selecting content provided by the external server 300 may be provided.

The memory 120 according to one or more embodiments of the disclosure may store profile information corresponding to each of the plurality of users.

The processor 130 may provide a user interface (UI) for selecting any one of the plurality of users when driving the display apparatus 100 or entering the execution mode of the application.

Subsequently, the processor 130 may identify profile information corresponding to a user selected from among a plurality of profiles through the UI and transmit the request 1 including the identified profile information to the external server 300.

For example, when "USER 1" is selected, the processor 130 may transmit the request 1 including profile information corresponding to the "USER 1" to the external server 300.

Accordingly, the processor 130 may receive from the external server 300 the video information 30 related to an application (e.g., the application that the selected user is currently playing, or the application (e.g., game) that the selected user recently played) corresponding to the selected user.

In FIG. 7, when the display apparatus 100 enters the execution mode of the application, the case in which the video information 30 is provided to one area on the execution mode is illustrated, but this is an example and is not limited thereto.

Figure 8:
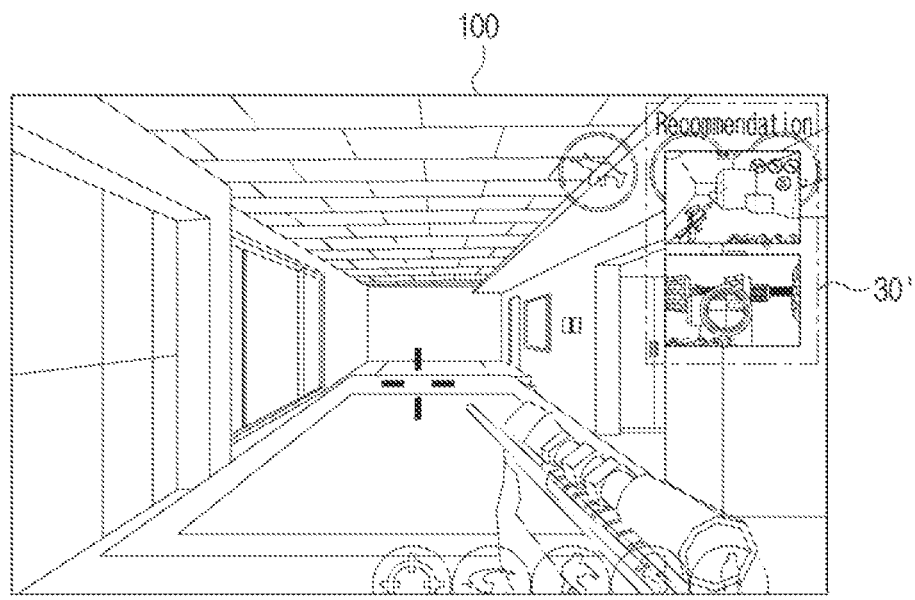
FIG. 8 is a diagram for describing the method of providing video information according to the embodiment of the disclosure.

FIG. 8 is a diagram for describing the method of providing video information according to the embodiment of the disclosure.

Referring to FIG. 8, the processor 130 may acquire the first image frame 20-1 being output through the display 110 while the application is running.

Subsequently, when the number of image frames having the similarity to the first image frame 20-1 among the plurality of image frames stored in the memory 110 is equal to or greater than the threshold number, the processor 130 may obtain the background information and the object information included in the first image frame 20-1 as the frame information.

Subsequently, the processor 130 may obtain the profile information including the identification information of the application and the frame information. Meanwhile, when the profile information including the frame information corresponding to the first image frame 20-1 already exists (or has been acquired at a previous time), the processor 130 may increase the number information included in the profile information.

Subsequently, the processor 130 may transmit the request 1 including the profile information to the external server 300, and provide video information 30' received from the external server 300 according to the request 1 to one area on the screen (e.g., execution screen of an application) being output through the display 110.

When it is determined that the user is having difficulty with a specific background and a specific object while executing the application (e.g., game), the processor 130 may provide, as the video information 30', such as video (e.g., tip video, walk-through video) etc., related to a specific background and a specific object etc., to one area on the execution screen of the application.

FIG. 9 is a diagram for describing a priority of profile information according to one or more embodiments of the disclosure.

Referring to FIG. 5, each of the plurality of log data stored in the memory 120 may include at least one of the identification information of the user, the identification information (title information) of the application, the frame information, the number information (e.g., number of trials), or the acquisition time of the log data. According to an embodiment, the processor 130 may identify a priority of the profile information corresponding to the data based on at least one of the number information or the acquisition time included in each of the plurality of log data.

For example, as illustrated in FIG. 9, when a plurality of log data corresponding to a user (or a user logged in to the display apparatus 100, or a user logged in to the external device 200) selected through a UI are identified, the processor 130 may obtain the profile information corresponding to each of the plurality of log data. In addition, the processor 130 may identify priorities of each of the plurality of profile information based on at least one of the number information or the acquisition time included in each of the plurality of log data.

For example, when the plurality of log data corresponding to the "USER 1" is identified, the processor 130 may set the profile information corresponding to the log data having the largest number information as a top priority (e.g., priority 1) based on the number information included in each of the plurality of log data. For example, the processor 130 preferentially transmits the profile information having the largest number information to the external server 300 prior to the rest of the profile information based on the number information included in each of the plurality of profile information corresponding to the "USER 1", and may receive the video information 30 corresponding thereto.

For example, when the plurality of log data corresponding to the "USER 1" is identified, the processor 130 may set the profile information corresponding to the log data in which the number information rapidly increases during a preset time period as the top priority (e.g., priority 1) based on the number information included in each of the plurality of log data.

For example, the processor 130 may identify the log data in which the number information rapidly increases (for example, the number information increases more than twice, or the number information increases more than 20 times, etc.) in a preset time interval (e.g., in the last hour) based on the number information included in each of the plurality of log data corresponding to the "USER 1" and transmit the profile information corresponding to the identified log data to the external server 300 prior to other profile information and receive the video information 30 corresponding thereto. This is represented by a sudo code as follows.

TABLE 3 check log storage
if log now try number >= ( log initial try number * 2 ) And now log created date within 1hour
   configure real time profile
   save profile in profile of database
   send to alarm message to A service
endif For example, when it is identified that an image frame having a similarity to specific frame information equal to or greater than a threshold value is equal to or greater than a threshold number of times within a preset time interval, the processor 130 may identify profile information including the specific frame information as top-priority profile information or real-time profile information. Subsequently, the processor 130 may transmit the request 1 including the real-time profile information to the external server 300.

For example, when the plurality of log data corresponding to the "USER 1" is identified, the processor 130 may set the profile information corresponding to the log data having the most recent acquisition time as the top priority (e.g., priority 1) based on the acquisition time included in each of the plurality of log data. For example, the processor 130 transmits the profile information having the most recent acquisition time to the external server 300 prior to other profile information based on the acquisition time included in each of the plurality of profile information corresponding to the "USER 1", and may receive the video information 30 corresponding thereto.

In addition, when the plurality of log data corresponding to the "USER 1" is identified, the processor 130 may set the profile information corresponding to the log data corresponding to the application currently being displayed through the display 110 as the top priority based on the identification information of the application included in each of the plurality of log data.

Returning to FIG. 2, the display apparatus 100 according to one or more embodiments of the disclosure includes a communication interface. The communication interface receives various types of data. For example, the communication interface may receive various types of data from at least one external device 200 provided in the home, an external storage medium (e.g., USB memory), an external server (e.g., web hard or streaming server) 300, etc., through communication methods such as AP-based Wi-Fi (wireless LAN network), Bluetooth, Zigbee, a wired/wireless local area network (LAN), a wide area network (WAN), Ethernet, IEEE 1394, a high-definition multimedia interface (HDMI), a universal serial bus (UBS), a mobile high-definition link (MHL), an audio engineering society/European broadcasting union (AES/EBU), optical, and coaxial.

According to an example, the communication interface may use the same communication module (for example, the WiFi module) to communicate with an external device such as a remote control device and an external server.

According to an example, the communication interface may use different communication modules to communicate with an external device such as a remote control device and an external server. For example, the communication interface may use at least one of the Ethernet module or the WiFi module to communicate with the external server, and may use a Bluetooth module to communicate with the external device such as the remote control device. However, this is only an example, and the communication interface may use at least one of various communication modules in a case in which it communicates with a plurality of external devices or external servers.

In particular, the communication interface according to one or more embodiments of the disclosure may perform communication with the external device 200 under the control of the processor 130, receive a screen corresponding to an application being executed by the external device 200, and provide the received screen through the display 110. For example, when content is received from the external device 200 through the communication interface, the processor 130 may control the display 110 to provide a screen corresponding to the content.

The processor 130 may obtain the identification information of the application by analyzing at least one image frame included in the content.

For example, when the external device 200 is a console, the external device 200 may play a game and transmit a plurality of image frames corresponding to a user manipulation for the game to the display apparatus 100. The processor 130 may obtain the identification information of the application by analyzing the plurality of image frames received from the external device 200. For example, the processor 130 may obtain the identification information of the application being executed in the external device 200 by performing optical character recognition (OCR) on each of the plurality of image frames.

However, this is an example, and when the processor 130 itself executes an application, the processor 130 may obtain the identification information of the application being executed. Also, the processor 130 may receive and obtain the identification information of the application from the external server 300 when the external server 300 (e.g., cloud server) executes an application.

The processor 130 according to one or more embodiments of the disclosure may input the plurality of profile information to a neural network model to identify a correlation between the frame information included in each of the plurality of profiles.

For example, when the probability that the profile information including the first frame information includes the second frame information is equal to or greater than 0.7 based on the plurality of profile information, the neural network model may identify that there is a correlation between the first frame information and the second frame information.

In addition, when the probability that the profile information including the first frame information includes the second frame information is less than 0.7 based on the plurality of profile information, the neural network model may identify that there is no correlation between the first frame information and the second frame information. Here, specific numbers are examples for convenience of description, and are not limited thereto.

Subsequently, the processor 130 may obtain specific background information and object information having a correlation with the frame information included in the first image frame 20-1 equal to or greater than the threshold value (e.g., 0.7), and transmit the request 1 including the specific background information and the object information to the external server 300.

For example, when the processor 130 determines based on the plurality of profile information that the probability that the profile information including the frame information included in the first image frame 20-1 includes the specific frame information (for example, specific background information and object information that are scheduled to be provided after the background information and the object information included in the first image frame 20-1 according to the game progress sequence) is 0.7 or greater, the processor 130 may generate the profile information including the specific frame information in advance by using the neural network model.

Accordingly, the processor 130 may obtain the profile information including the specific frame information in advance prior to obtaining the specific frame information from the image frame being output through the display 110, and transmit the request 1 including the specific frame information to the external server 300.

When it is determined that a user is having difficulty in the background information and the object information corresponding to the first image frame 20-1 while playing a game, the processor 130 may determine that there is a high probability that the user is having difficulty in the specific frame information having a correlation with the background information and the object information corresponding to the first image frame 20-1 equal to or greater than the threshold value and obtain the profile information including the specific frame information in advance, and receive video related to the specific frame information (video related to the specific background and the specific object) from the external server 300.

The neural network model may be trained to identify the correlation between the frame information included in each of the plurality of profile information by using the plurality of profile information as training data. Meanwhile, training the neural network model means that the predefined operation rule or neural network model set to perform a desired characteristic (or purpose) is created by training a basic neural network model (e.g., neural network model including any random parameters) using a plurality of training data by a learning algorithm. Such training may be performed through a separate server and/or system, but is not limited thereto and may be performed in the electronic device 100. Examples of the learning algorithms include supervised learning, unsupervised learning, semi-supervised learning, transfer learning, or reinforcement learning, but are not limited to the above examples.

Each neural network model may be implemented as, for example, a convolutional neural network (CNN), a recurrent neural network (RNN), a restricted Boltzmann machine (RBM), a deep belief network (DBN), a bidirectional recurrent deep neural network (BRDNN), or deep Q-networks, but is not limited thereto.

The processor 130 for executing the neural network model according to one or more embodiments of the disclosure may be implemented by a combination of a general-purpose processor such as a CPU, AP, and a digital signal processor (DSP), a graphics-only processor such as a GPU and a vision processing unit (VPU), or a neural network-specific processor such as NPU, and software. The processor 130 may control to process input data according to the predefined operation rule or AI model stored in the memory 120. Alternatively, when the processor 130 is a dedicated processor (or a neural network-only processor), the processor 130 may be designed as a hardware structure specialized for processing the specific neural network model. For example, hardware specialized for processing the specific neural network model may be designed as a hardware chip such as ASIC or FPGA. When the processor 130 is implemented as a dedicated processor, the processor 130 may be implemented to include a memory for implementing an embodiment of the disclosure or to include a memory processing function for using an external memory.

The memory 120 may store information on a neural network model including a plurality of layers. Here, storing the information on the neural network model may means storing various types of information related to the operation of the neural network model, for example, information on a plurality of layers included in the neural network model, and information on parameters (e.g., filter coefficients, bias, etc.) used in each of the plurality of layers.

When the plurality of video information is received from the external server 300 according to the request 1, the processor 130 may arrange the plurality of video information according to priority and then provide the plurality of arranged video information.

For example, the processor 130 may preferentially provide real-time video over recorded video among a plurality of video information according to the priority. In addition, the processor 130 may arrange the plurality of video information according to the priority based on the number of current viewers, the number of accumulated viewers, and views, and then provide the plurality of arranged video information.

Returning to FIG. 2, an electronic device that does not include the display 110 may perform various functions of the disclosed embodiments. The electronic device may be connected to an external display apparatus and transmit an image or content stored in the electronic device to the external display apparatus. Specifically, the electronic device may transmit an image or content to an external display apparatus together with a control signal for controlling the image or content to be displayed on the external display apparatus. The external display apparatus may be connected to the electronic device through the communication interface 110 or the input/output interface 160. For example, the electronic device 100 may not include a display like a set top box (STB). Also, the electronic device 100 may include only a small display capable of displaying only simple information such as text information. The electronic device 100 may transmit the image or content to the external display apparatus in a wired or wireless manner through the communication interface or to the external display apparatus through the input/output interface.

The display apparatus 100 may include the input/output interface. The input/output interface may be an interface of any one of a high definition multimedia interface (HDMI), a mobile high-definition link (MHL), a universal serial bus (USB), a display port (DP), Thunderbolt, a video graphics array (VGA) port, an RGB port, a D-subminiature (D-SUB), and a digital visual interface (DVI). The input/output interface may input/output at least one of audio and video signals. Depending on the implementation example, the input/output interface may include a port for inputting/outputting only an audio signal and a port for inputting/outputting only a video signal as separate ports, or may be implemented as a single port for inputting/outputting both an audio signal and a video signal. Meanwhile, the display apparatus 100 may transmit at least one of audio and video signals to the external device 200 (e.g., a console, or an external speaker) through the input/output interface. Specifically, an output port included in the input/output interface may be connected to an external device, and the display apparatus 100 may transmit at least one of the audio and video signals to the external device 200 through the output port.

The display apparatus 100 may include a microphone. For example, there may be various embodiments in which the display apparatus 100 performs an operation corresponding to a user voice signal received through the microphone.

For example, there may be various embodiments in which the display apparatus 100 control the display 110 based on a voice signal received through the microphone. For example, when a user voice signal for displaying content A is received, the display apparatus 100 may control the display 110 to display content A.

For example, when the user voice signal for selecting any one of a plurality of video information is received, the display apparatus 100 may control the display 110 to output the selected video information.

For example, the display apparatus 100 may control the external device 200 connected to the display apparatus 100 based on the user voice signal received through the microphone. Specifically, the display apparatus 100 may generate a control signal for controlling the external device 200 so that the operation corresponding to the user voice signal is performed in the external device 200, and transmit the generated control signal to the external device 200.

The display apparatus 100 may store a remote control application for controlling the external device 200. The display apparatus 100 may transmit the generated control signal to the external display apparatus using at least one communication method among Bluetooth, Wi-Fi, and infrared rays. For example, when the user voice signal for displaying any one of the plurality of video information is received, the display apparatus 100 may transmit the control signal to the external device 200 so that the external device 200 transmits the video information corresponding to the user voice signal.

The display apparatus 100 may refer to various terminal devices capable of installing remote control applications such as a smart phone and an AI speaker.

For example, the display apparatus 100 may use a remote control device to control the external device 200 connected to the display apparatus 100 based on the user voice signal received through the microphone. Specifically, the display apparatus 100 may transmit to the remote control device the control signal for controlling the external device 200 so that the operation corresponding to the user voice signal is performed in the external device 200. The remote control device may transmit the control signal received from the display apparatus 100 to the external device 200. For example, when the user voice signal for displaying any one of the plurality of video information is received, the display apparatus 100 may transmit the control signal to the remote control device so that the external device 200 transmits the video information corresponding to the user voice signal, and the remote control device may transmit the received control signal to the external device 200.

The display apparatus 100 itself may perform overall operations according to various embodiments of the disclosure. Specifically, the display apparatus 100 may obtain the frame information, and obtain and output the video information based on the frame information.

The display apparatus 100 may obtain the profile information and transmit a request corresponding to the acquired profile information to the server. Other operations, for example, operations of obtaining video information corresponding to a request and transmitting the acquired video information to the display apparatus may be performed by the external server. However, it is not limited thereto, and the operation subject of the operations described in various embodiments of the disclosure may be changed according to implementation examples.

Figure 10:
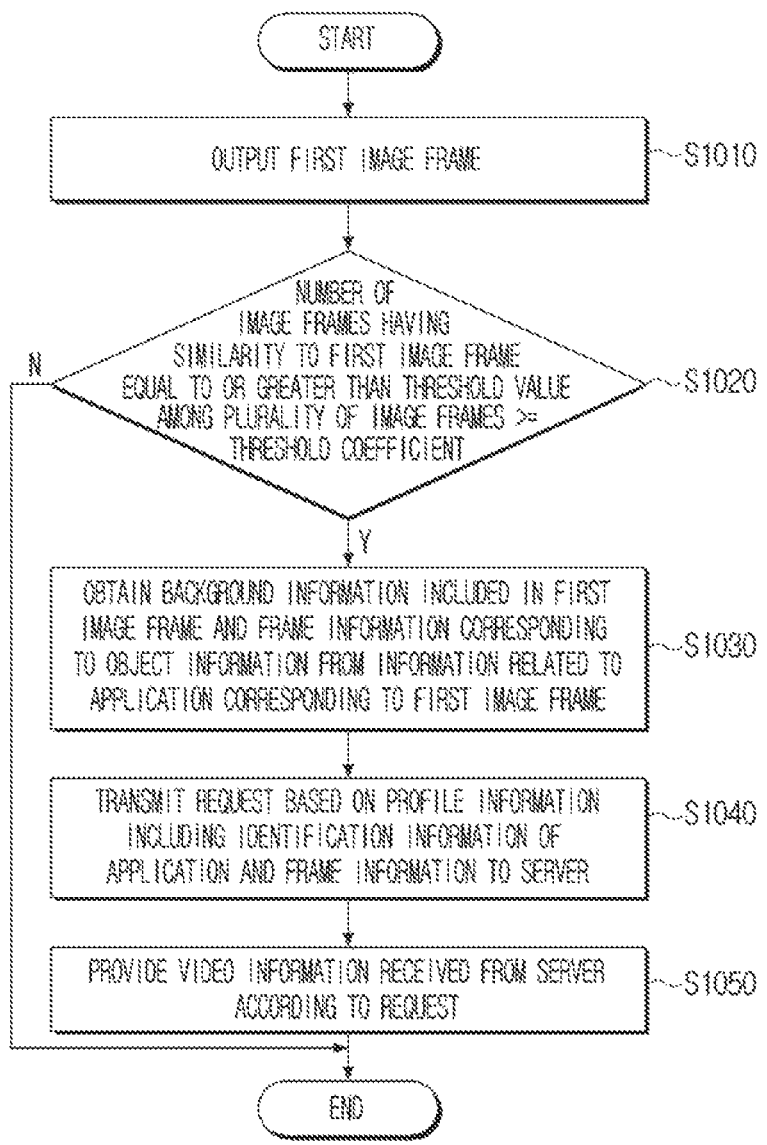
FIG. 10 is a flowchart for describing a method of controlling a display apparatus according to one or more embodiments of the disclosure.

FIG. 10 is a flowchart for describing a method of controlling a display apparatus according to one or more embodiments of the disclosure.

In the method for controlling a display apparatus according to one or more embodiments of the disclosure, first, the first image frame is output through the display (see step S1010).

Subsequently, when it is determined based on the first image frame and the plurality of image frames that the number of image frames having the similarity to the first image frame equal to or greater than the threshold value among the plurality of image frames is equal to or greater than the threshold number (see step S1020: Y), the frame information corresponding to the background information and the object information included in the first image frame is obtained from the information related to the application corresponding to the first image frame (see step S1030).

Subsequently, the request based on the profile information including the identification information of the application and the frame information is transmitted to the server (see step S1040).

Subsequently, the video information received from the server is provided according to the request (S1050).

When it is determined based on the first image frame and the plurality of image frames that the number of image frames having the similarity to the first image frame equal to or greater than the threshold value among the plurality of image frames is less than the threshold number (See step S1020: N), the first image frame may be stored.

According to an example, the profile information further includes information on the number of image frames having a similarity. The control method may further include: storing the first image frame, when it is identified based on the plurality of image frames and the second image frame acquired after a predetermined time has elapsed after the first image frame is acquired that the number of image frames having the similarity to the second image frame equal to or greater than the threshold value among the plurality of image frames is equal to or greater than the threshold number and the similarity between the first image frame and the second image frame is equal to or greater than the threshold value, increasing the number information included in the profile information, and when it is identified that the number of image frames having the similarity to the second image frame equal to or greater than the threshold value among the plurality of image frames is equal to or greater than the threshold number, and the similarity between the first image frame and the second image frame is less than the threshold value, generating the profile information corresponding to the second image frame.

The increasing of the number information may include comparing a similarity between a first background included in the first image frame and a second background included in the second image frame and a similarity between a first object included in the first image frame and a second object included in the second image frame and when each of the similarity between the first background and the second background and the similarity between the first object and the second object is equal to or greater than the threshold value, identifying that the first image frame and the second image frame have the similarity equal to or greater than the threshold value.

The control method may further include, when content is received from the external device, controlling the display to provide the screen corresponding to the content, and obtaining the identification information of the application based on at least one image frame corresponding to the content.

The display apparatus may store the profile information corresponding to each of the plurality of users. The control method may further include obtaining profile information corresponding to a user selected through a user interface (UI) for selecting any one of a plurality of users and outputting video information received from a server to a specific area of a display when the application is executed.

Each of the plurality of profiles includes at least one of the identification information of the user, the identification information of the application, the frame information, the number information, or the acquisition time of the profile information, and the control method may further include obtaining a priority of the profile information based on at least one of the number information included in each of the plurality of profiles or the acquisition time of the profile information.

The transmitting (see step S1040) may include transmitting to the server the request based on the profile information corresponding to the top priority based on the priority corresponding to each of the plurality of profiles corresponding to the selected user.

The control method according to an embodiment may further include inputting a plurality of profiles to a neural network model to obtain the specific background information and the object information having the correlation between the frame information included in each of the plurality of profiles and the correlation with the frame information included in the first image frame equal to or greater than the threshold value and transmitting the request including the acquired specific background information and object information to the server.

The control method according to an example further includes outputting the plurality of video information sorted according to the priority when the plurality of video information is received from the server according to the request, and each of the plurality of video information includes a thumbnail image of the corresponding video.

The outputting may include controlling the display so that real-time video is output prior to recorded video according to the priority among the plurality of video information.

However, various embodiments may be applied to all electronic devices including the display as well as the display apparatus.

The diverse exemplary embodiments of the disclosure described above may be implemented in a computer or a computer readable recording medium using software, hardware, or a combination of software and hardware. In some cases, embodiments described in the disclosure may be implemented by the processor itself. According to a software implementation, embodiments such as procedures and functions described in the disclosure may be implemented by separate software modules. Each of the software modules may perform one or more functions and operations described in the disclosure.

Computer instructions for performing processing operations of the electronic apparatus 100 according to various embodiments of the disclosure described above may be stored in a non-transitory computer-readable medium. The computer instructions stored in the non-transitory computer-readable medium allow a specific device to perform the processing operations of the electronic apparatus and the display apparatus according to the diverse exemplary embodiments described above when they are executed by a processor of the specific device.

The non-transitory computer-readable medium is not a medium that stores data for a while, such as a register, a cache, or a memory, but means a medium that semi-permanently stores data and is readable by the apparatus. A specific example of the non-transitory computer-readable medium may include a compact disk (CD), a digital versatile disk (DVD), a hard disk, a Blu-ray disk, a universal serial bus (USB), a memory card, or a read only memory (ROM).

Although exemplary embodiments have been illustrated and described hereinabove, the disclosure is not limited to the abovementioned specific exemplary embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A display apparatus, comprising:
 a communication interface;
 a display;
 a memory configured to store a plurality of application image frames; and
 one or more processors configured to:
  based on a first output image frame that is output to the display and the plurality of application image frames, obtain frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number,
  transmit a request based on profile information including identification information of the application and the frame information to a server through the communication interface, and
  control the display to provide video information received from the server through the communication interface corresponding to the request.

2. The display apparatus as claimed in claim 1,
 wherein the profile information further includes number information corresponding to the number of the plurality of application image frames having the similarity,
 wherein the one or more processors are further configured to:
  store the first output image frame in the memory,
  when identifying, based on a second output image frame acquired after a predetermined time has elapsed from the first output image frame being acquired and the plurality of application image frames stored in the memory, that (i) a number of the plurality of application image frames having a similarity to the second output image frame equal to or greater than the threshold value is equal to or greater than the threshold number and (ii) a similarity between the first output image frame and the second output image frame is equal to or greater than the threshold value, increase the number information included in the profile information, and
  when identifying that (i) the number of the plurality of application image frames having the similarity to the second output image frame equal to or greater than the threshold value is equal to or greater than the threshold number, and (ii) the similarity between the first output image frame and the second output image frame is less than the threshold value, generate second profile information corresponding to the second image output frame.

3. The display apparatus as claimed in claim 2, wherein the one or more processors being configured to increase the number information includes being configured to:
 compare a similarity between a first background included in the first output image frame and a second background included in the second output image frame and a similarity between a first object included in the first output image frame and a second object included in the second output image frame, and
 when each of the similarity between the first background and the second background and the similarity between the first object and the second object is equal to or greater than the threshold value, identify that similarity between the first output image frame and the second output image frame is equal to or greater than the threshold value.

4. The display apparatus as claimed in claim 1, wherein the one or more processors are further configured to:
 control the display to provide a screen corresponding to content when the content is received from an external device through the communication interface, and obtain the identification information of the application based on at least one content image frame corresponding to the content.

5. The display apparatus as claimed in claim 1,
wherein the memory is configured to store the profile information corresponding to each of a plurality of users, and
wherein the one or more processors are further configured to:
   obtain the profile information corresponding to a user of the plurality of users selected through a user interface (UI), and
   control the display to output the video information received from the server to a specific area of the display when the application is executed.

6. The display apparatus as claimed in claim 5,
wherein the profile information corresponding to each of the plurality of users includes identification information of the user, the identification information of the application, the frame information, the number information, or an acquisition time of the profile information, and
wherein the one or more processors are further configured to obtain a priority of the profile information based on at least one of the number information included in the profile information of each of the plurality of users or the acquisition time of the profile information.

7. The display apparatus as claimed in claim 6, wherein the one or more processors are further configured to transmit to the server the request based on the profile information corresponding to a top priority based on a priority corresponding to each of a plurality of profiles corresponding to the selected user.

8. The display apparatus as claimed in claim 7, wherein the one or more processors are further configured to:
   input the plurality of profiles stored in the memory to a neural network model to obtain specific background information and specific object information having a correlation between the frame information included in each of the plurality of profiles and a correlation with the frame information included in the first output image frame equal to or greater than the threshold value, and
   transmit a request including the acquired specific background information and the specific object information to the server.

9. The display apparatus as claimed in claim 1,
wherein the video information includes a plurality of video information,
wherein the one or more processors are further configured to control the display to output the plurality of video information sorted according to a priority when the plurality of video information is received from the server according to the request, and
wherein each of the plurality of video information includes a thumbnail image of corresponding video.

10. The display apparatus as claimed in claim 9, wherein the one or more processors are further configured to control the display so that real-time video is output prior to recorded video according to the priority among the plurality of video information.

11. A method of controlling a display apparatus, comprising:
   outputting a first output image frame through a display;
   based on the first output image frame and a plurality of application image frames, obtaining frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number;
   transmitting a request based on profile information including identification information of the application and the frame information to a server; and
   providing video information received from the server corresponding to the request.

12. The method as claimed in claim 11,
wherein the profile information further includes number information corresponding to the number of the plurality of application image frames having the similarity,
wherein the method further comprises:
   storing the first output image frame;
   when identifying, based on a second output image frame acquired after a predetermined time has elapsed from the first output image frame being acquired and the plurality of application image frames, that a number of the plurality of application image frames having (i) a similarity to the second output image frame equal to or greater than the threshold value is equal to or greater than the threshold number and (ii) a similarity between the first output image frame and the second output image frame is equal to or greater than the threshold value, increasing the number information included in the profile information; and
   when identifying that (i) the number of the plurality of application image frames having the similarity to the second output image frame equal to or greater than the threshold value is equal to or greater than the threshold number, and (ii) the similarity between the first output image frame and the second output image frame is less than the threshold value, generating second profile information corresponding to the second image output frame.

13. The method as claimed in claim 12, wherein the increasing of the number information comprises:
   comparing a similarity between a first background included in the first output image frame and a second background included in the output second image frame and a similarity between a first object included in the first output image frame and a second object included in the second output image frame; and
   when each of the similarity between the first background and the second background and the similarity between the first object and the second object is equal to or greater than the threshold value, identifying that similarity between the first output image frame and the second output image frame is equal to or greater than the threshold value.

14. The method as claimed in claim 11, wherein the method further comprises:
   controlling the display to provide a screen corresponding to content when the content is received from an external device; and
   obtaining the identification information of the application based on at least one content image frame corresponding to the content.

15. The method as claimed in claim 11,
wherein the display apparatus stores profile information corresponding to each of a plurality of users, and wherein the method further comprises:
obtaining the profile information corresponding to a user of the plurality of users selected through a user interface (UI); and
controlling the display to output the video information received from the server to a specific area of the display when the application is executed.

16. The method as claimed in claim 15,
wherein the profile information corresponding to each of the plurality of users includes identification information of the user, the identification information of the application, the frame information, the number information, or an acquisition time of the profile information, and
wherein the method further comprises obtaining a priority of the profile information based on at least one of the number information included in the profile information of each of the plurality of users or the acquisition time of the profile information.

17. The method as claimed in claim 16, wherein the method further comprises transmitting to the server the request based on the profile information corresponding to a top priority based on a priority corresponding to each of a plurality of profiles corresponding to the selected user.

18. The method as claimed in claim 17, wherein the method further comprises:
inputting the plurality of profiles stored in the memory to a neural network model to obtain specific background information and specific object information having a correlation between the frame information included in each of the plurality of profiles and a correlation with the frame information included in the first output image frame equal to or greater than the threshold value, and
transmitting a request including the acquired specific background information and the specific object information to the server.

19. The method as claimed in claim 11,
wherein the video information includes a plurality of video information,
wherein the method further comprises controlling the display to output the plurality of video information sorted according to a priority when the plurality of video information is received from the server according to the request, and
wherein each of the plurality of video information includes a thumbnail image of corresponding video.

20. A non-transitory computer readable recording medium comprising a program for executing a control method of a display apparatus, the control method including:
outputting a first output image frame through a display;
based on the first output image frame and a plurality of application image frames, obtaining frame information corresponding to background information and object information included in the first output image frame from information related to an application corresponding to the first output image frame based on that a number of the plurality of application image frames having a similarity to the first output image frame equal to or greater than a threshold value is equal to or greater than a threshold number;
transmitting a request based on profile information including identification information of the application and the frame information to a server; and
providing video information received from the server corresponding to the request.

* * * * *